No. 699,145. Patented May 6, 1902.
J. B. BUTLER.
ANIMAL TRAP.
(Application filed July 13, 1901.)
(No Model.)

Witnesses
L. G. Handy
C. Chester

Inventor
J. B. Butler
By W. T. Fitzgerald
Attorneys.

UNITED STATES PATENT OFFICE.

JOHN B. BUTLER, OF ETHEL, ARKANSAS.

ANIMAL-TRAP.

SPECIFICATION forming part of Letters Patent No. 699,145, dated May 6, 1902.

Application filed July 13, 1901. Serial No. 68,156. (No model.)

*To all whom it may concern:*

Be it known that I, JOHN B. BUTLER, a citizen of the United States, residing at Ethel, in the county of Arkansas and State of Arkansas, have invented certain new and useful Improvements in Animal-Traps; and I do hereby declare the following to be a full, clear, and exact description of the invention, such as will enable others skilled in the art to which it appertains to make and use the same.

My invention relates to animal-traps; and it consists of certain novel features of combination and construction of parts, as will be hereinafter clearly described and claimed.

The object of my invention is to provide an attachment for the ordinary well-known steel trap whereby the jaws thereof will be provided with means to prevent the animal after being caught from gnawing himself loose, as by biting off the limb engaged by the jaws of the trap.

Other objects and advantages will be made clearly apparent from the following specification, considered in connection with the accompanying drawings, in which—

Figure 1:
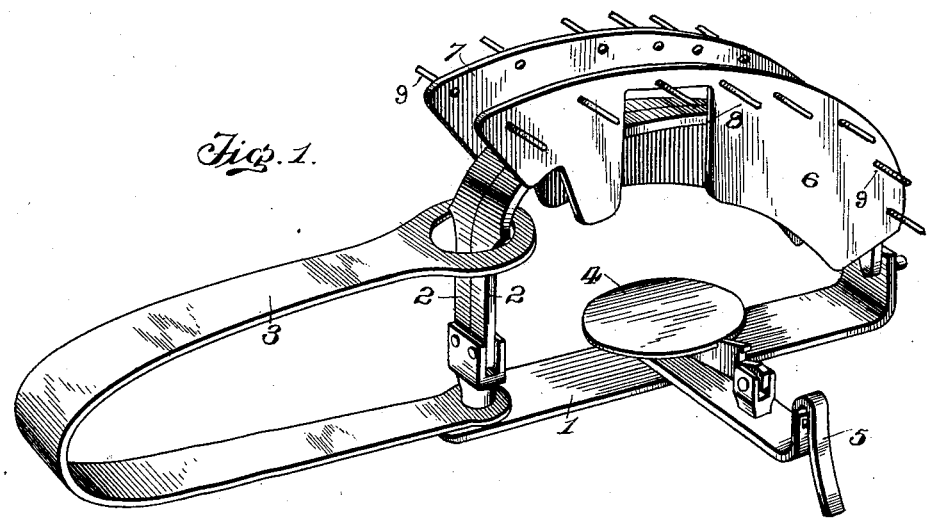
Figure 2:
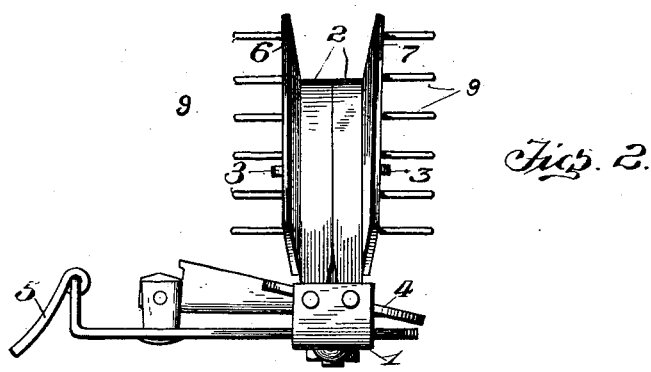
Figure 3:
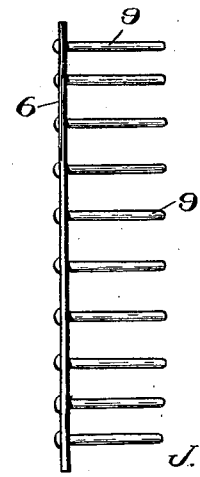

Figure 1 is a perspective view of my invention complete as applied to use upon a steel trap of the ordinary well-known construction. Fig. 2 is an end view thereof, taken from the right side of Fig. 1. Fig. 3 is an edge view of one of the guard members detached.

For convenience in referring to the several details of my invention and coöperating parts numerals will be employed, of which 1 indicates the base portion of an ordinary steel trap, provided, as is common, with the pair of jaws 2 and the controlling-spring 3, all of which may be of the usual or any preferred construction and do not comprehend any portion of my invention.

The base portion has attached thereto the well-known trigger mechanism comprising the bait-holding section 4 and the trigger 5, designed to coöperate therewith. My invention consists, essentially, in providing for each of the jaws 2 the guard-sections 6 and 7, the former being cut away to provide the recess or opening, as indicated by the numeral 8, the object of said recess being to permit the jaw to be brought downward into engagement without causing the guard 6 to interfere with the action of the trigger 5.

The guard sections or members 6 and 7 may be integrally formed with the jaw 2 or consist of separate portions firmly attached to the outer edges of the jaws, so as to extend above and below the same and prevent the animal from reaching under or above the jaws and biting off his limb at the point where the limb is benumbed or deadened.

The guard sections or members are provided with a plurality of outwardly-extending teeth or points 9, as shown, which serve to further prevent the animal from gaining access to that portion of his limb grasped by the jaws.

My improved trap provided with the attachments for the jaws above described may be used substantially in the usual manner, and it will be found that many animals now lost to the trapper by the use of jaws having no guards may be found a prisoner by him and his profits thereby increased.

My improved trap may be made any desired size deemed suitable for meeting the various requirements for which a trap is desirable, and while I have described the preferred construction I desire to comprehend in this application such substantial equivalents and substitutes as may be considered to fall fairly within the scope of my invention.

Having thus fully described the construction and manner of using my improved trap, what I claim as new, and desire to secure by Letters Patent, is—

An attachment for animal-traps consisting of a guard member for attachment to the jaw and having outwardly-extending teeth or points 9 as and for the purpose specified.

In testimony whereof I affix my signature in presence of two witnesses.

JOHN B. BUTLER.

Witnesses:
W. S. ROWND,
H. W. VERNON.